United States Patent [19]

Hirao et al.

[11] Patent Number: 5,893,310
[45] Date of Patent: Apr. 13, 1999

[54] METHOD AND APPARATUS FOR CUTTING A RUBBER SHEET MATERIAL USED TO FORM POWER TRANSMISSION BELTS

[75] Inventors: Katsuhiko Hirao, Inuyama; Akihiro Nagata, Komaki; Toshihiro Oonishi, Kani; Toshihiro Ueda, Iwakura, all of Japan

[73] Assignee: Mitsuboshi Belting Ltd., Hyogo, Japan

[21] Appl. No.: 08/728,164

[22] Filed: Oct. 9, 1996

Related U.S. Application Data

[63] Continuation of application No. 08/272,223, Jul. 8, 1994, abandoned.

[30] Foreign Application Priority Data

Jul. 16, 1993 [JP] Japan .................. 5-199251

[51] Int. Cl.⁶ .................................................. B26D 7/01
[52] U.S. Cl. .................. 83/278; 83/423; 83/437.1; 83/465; 83/466.1; 83/614; 83/935
[58] Field of Search ................... 83/466.1, 465, 83/278, 935, 614, 436.45, 423, 435.11, 437.1

[56] References Cited

U.S. PATENT DOCUMENTS

| | | | |
|---|---|---|---|
| 3,388,625 | 6/1968 | O'Brien et al. | 83/238 |
| 3,483,778 | 12/1969 | Forthmann, Jr. | 83/278 |
| 3,577,821 | 5/1971 | Medendorp | 83/238 |
| 3,838,619 | 10/1974 | Brotman et al. | 83/205 |
| 4,005,626 | 2/1977 | Bateman et al. | 83/278 |
| 4,150,741 | 4/1979 | Rubin | 83/278 |
| 4,516,451 | 5/1985 | Takeshita et al. | 83/614 |
| 4,554,850 | 11/1985 | Edgar et al. | 83/935 |
| 4,694,722 | 9/1987 | Collier et al. | 83/436 |
| 4,965,733 | 10/1990 | Kimura et al. | 83/581 |
| 5,027,516 | 7/1991 | howerton | 83/935 |
| 5,029,502 | 7/1991 | Irie | 83/578 |
| 5,127,294 | 7/1992 | Mohr | 83/36 |
| 5,211,091 | 5/1993 | Cole | 83/69 |
| 5,265,508 | 11/1993 | Bell et al. | 83/514 |
| 5,331,874 | 7/1994 | Foster et al. | 83/423 |

FOREIGN PATENT DOCUMENTS

2522750  12/1976  Germany .................. 83/466.1

*Primary Examiner*—Kenneth E. Peterson
*Attorney, Agent, or Firm*—Wood, Phillips, VanSanten, Clark & Mortimer

[57] ABSTRACT

A cutting apparatus for sheet material, such as a power transmission belt molding pad, which cutting apparatus has a first structure for supporting a sheet material, a second structure for engaging and advancing the sheet material on the first structure to a predetermined cutting position, and structure for guidingly cutting the sheet material in the cutting position.

15 Claims, 6 Drawing Sheets

METHOD AND APPARATUS FOR CUTTING A RUBBER SHEET MATERIAL USED TO FORM POWER TRANSMISSION BELTS

This application is a continuation of application Ser. No. 08/272,223, filed Jul. 8, 1994, now abandoned.

BACKGROUND OF THE INVENTION

1. Field of the Invention

This invention relates to power transmission belts and, more particularly, to an apparatus for quickly, accurately, and automatically cutting a sheet material of the type that can be used to define a mold element, such as a molding pad for producing cogged power transmission belts. The invention further contemplates a method of cutting a rubber sheet material using the inventive apparatus.

2. Background Art

Power transmission belts are known in which cogs are spaced at regular or irregular intervals along the length of the belt. These cogged belts, which are normally "raw edge" belts, may be formed by different processes, among which are the "preform" or "spancog" processes. In the conventional preformed process, a fabric layer and an unvulcanized rubber sheet are applied in turn against a mold that has alternating cogs and notches. The laminated sheet and fabric layers are pressed against the mold to conform thereto and define a cogged mold pad. The preformed cogged pad is then wrapped around a cylindrical core on a molding drum. The ends of the cogged pad are each cut in a straight line and abutted together to define an endless, cylindrical configuration around the core. A belt sleeve can then be formed by sequentially wrapping components around the pad.

To consistently define a high quality cogged pad, it is important to precisely precut the pad so that the ends thereof can be closely matched when butted. Typically, the cogged pad is spread out and marked to be cut to the appropriate length. An experienced operator will count the cogs and make a mark, as with chalk, on the cog to be cut. The operator then manually severs the pad with a cutter along the marked cog to define one butt end of the pad. The other pad end is defined in similar fashion.

Proper pad formation requires that the butt ends of the pad be cut so as not only to be straight in a transverse direction, but so that the end thicknesses precisely match when the ends are joined. If the matching is imprecise in terms of the straightness, thickness or angle of the butt edges, an inferior or incomplete joint may result between the butt ends. For example, if the pad is not cut precisely at the cog top, the edge thicknesses will not match. A gap may also form in a worse case, causing a volume crack and resulting in a failed joint. A belt made with the defective pad may develop a crack at the location of the joint as a result of load fluctuation or heat generation as the belt is running.

SUMMARY OF THE INVENTION

The present invention is specifically directed to overcoming the above enumerated problems in a novel and simple manner.

In one form of the invention, a cutting apparatus is provided for sheet material, such as a power transmission belt molding pad, which cutting apparatus has a first structure for supporting a sheet material, a second structure for engaging and advancing the sheet material on the first structure to a predetermined cutting position, and structure for guidingly cutting the sheet material in the cutting position.

2

With the inventive structure, a non-experienced operator can quickly and accurately sever a rubber sheet material in a straight line at a precise location along the length of the sheet, as along the top of a cog, to produce a consistent, high quality rubber molding element, such as that used to define cogged belts.

The cutting apparatus can be used to align and cut other types of sheet material that require cuts that are precise in terms of straightness, lengthwise alignment and bias.

The first structure can include a flat, upwardly facing surface to support the sheet material or may be defined by a plurality of rolling members that cooperatively define the equivalent of a flat surface, with the rolling members facilitating movement of the sheet material relative to the supporting first structure.

In one form, the sheet material has an exposed, contoured surface and the second structure includes a third structure having a surface that is complementary to the contoured surface of the sheet material for engaging the contoured surface. The surface of the third structure can be partially or fully matched to the contoured surface of the sheet material.

The third structure may be an elongate bar.

The second structure may include structure for moving at least a portion of a sheet supported on the first structure vertically away from the upwardly facing surface thereon and translating the sheet material in a horizontal path. The structure for moving the sheet material may include a plate and at least one finger that projects through the upwardly facing surface of the first structure and has a free end to engage the sheet material that is being advanced.

The sheet material is positively maintained in the desired orientation at the cutting position by urging the third structure against the sheet material and in turn against the supporting surface therefor. To accomplish this, a pressing element can be provided for engaging the third structure, with there being an extendable cylinder for advancing the pressing element against the third structure.

The pressing element may be advanced by the extendable cylinder in a line other than at a right angle to the plane of the upwardly facing flat surface supporting the sheet material.

To limit movement of the sheet material as it realizes the cutting position, cooperating structure may be provided on the first and second structures. In one form, the third structure cooperates with at least one of the pressing element and cylinder for limiting movement of the second structure.

The third structure/bar may be releasably held in its operative position. This facilitates assembly and interchange of bars having different configurations to accommodate different size, form, and/or pitch of cogs.

A storage structure can be provided for the separate bars. The storage structure and/or the structure for releasably holding the bars can be relatively repositioned to effect transfer of bars between the storage structure and the releasable bar holding structure. To facilitate this transfer, the bar holding structure may be in the form of first and second grippers that are movable selectively towards each other to a gripping position and away from each other to a release position.

The bar may include structure for guiding a cutting element relative to a sheet material in the cutting position. Thus, the bar may serve the dual purposes of maintaining the position of the sheet material and guiding the cutting element relative thereto.

In one form, the cutting element extends through a slot in the surface supporting the sheet material and into a guide slot in the bar. The slots are preferably aligned to permit the butt ends of the sheet material to be cut at a right angle or otherwise in relationship to a flat surface on the sheet material. In the event that the angle is other than a right angle, the pressing element is preferably advanced in a line against the bar that is substantially parallel to the angle of inclination of the cutting element to thereby reduce the tendency of the sheet material to skew and/or bind as it is cut.

In another form of the invention, a cutting system is provided having a sheet material with an exposed contoured surface used to define a portion of a power transmission belt, first structure for supporting the sheet material so that the contoured surface of the sheet material is exposed, second structure for engaging the contoured surface of the sheet material and advancing the sheet material consistently to a predetermined cutting position, and structure for guidingly cutting the sheet material in the cutting position.

The invention further contemplates a method for consistently cutting a sheet material having an exposed contoured surface, which method includes the steps of placing the sheet material on a support, placing a bar against the contoured surface of the sheet material, advancing the bar and the sheet material to situate the sheet material in a cutting position relative to the support, and cutting the sheet material by guiding a cutting element in a predetermined path relative to the sheet material in the cutting position.

To maintain the relative positions of the bar and sheet material, a part of the bar is meshed with the contoured surface of the sheet material.

The bar can be used to guide movement of the cutting element. A slot may be provided in the bar for this purpose.

The bar is advanced with the sheet material preferably to align the slot therein with a slot through the support to allow the cutting element to be advanced through the slot in the support and into the guide slot in the bar.

During the cutting step, the free edge of the flat material may make an angle of other than 90° with a flat surface thereof.

The contoured surface of the sheet material may be defined by a plurality of elongate cogs extending widthwise of the sheet material and spaced regularly or irregularly along the length of the sheet material. The cutting step involves the step of moving the cutting element along the width of the sheet material parallel to the length of the cogs.

Structure may be provided for storing one or more inactive bars. The bars may be selectively loaded and unloaded from the storing means.

DETAILED DESCRIPTION OF THE DRAWINGS

Figure 1:
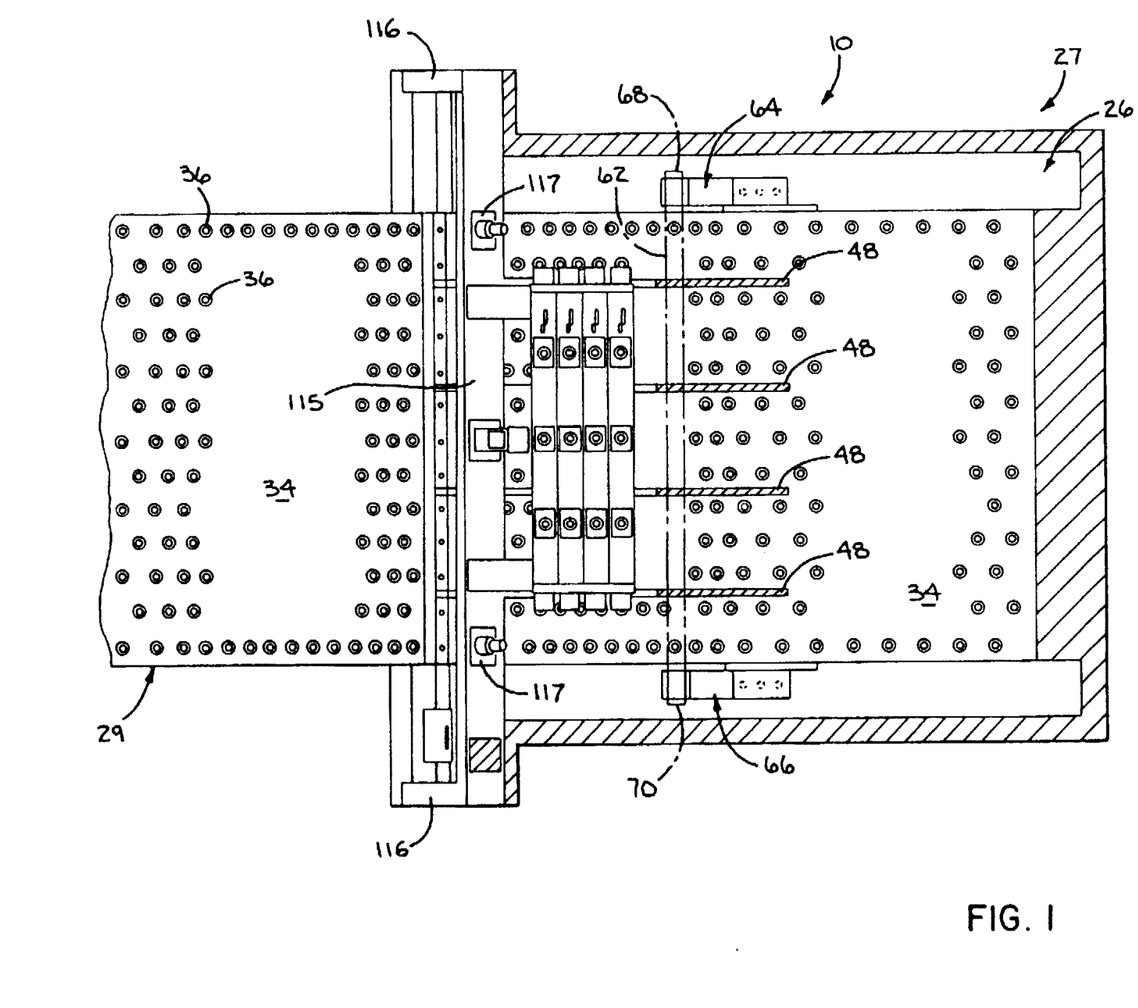
FIG. 1 is a plan view of a portion of a cutting apparatus for a sheet material according to the present invention.
Figure 2:
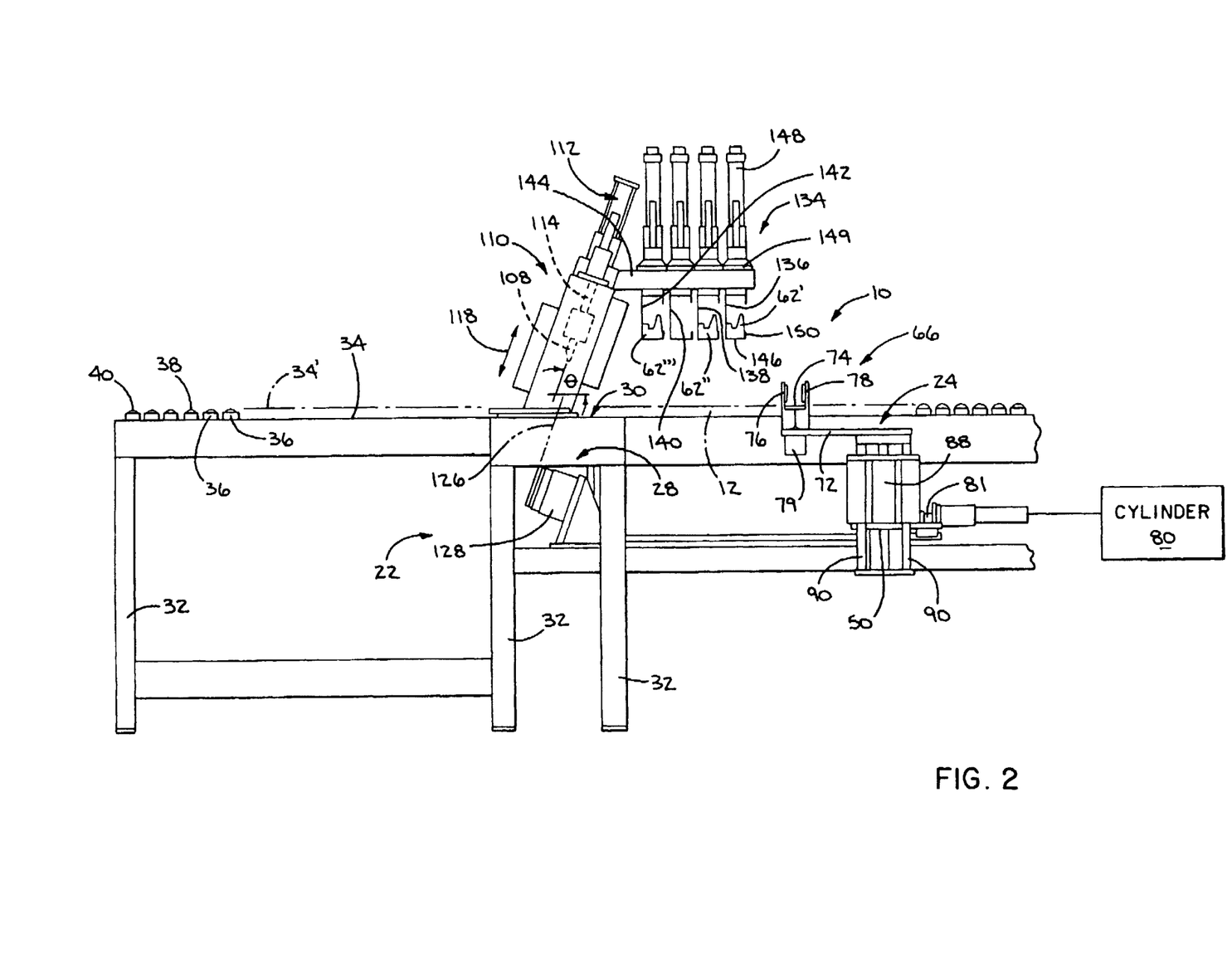
FIG. 2 is a side elevation view of the cutting apparatus in FIG. 1.
Figure 3:
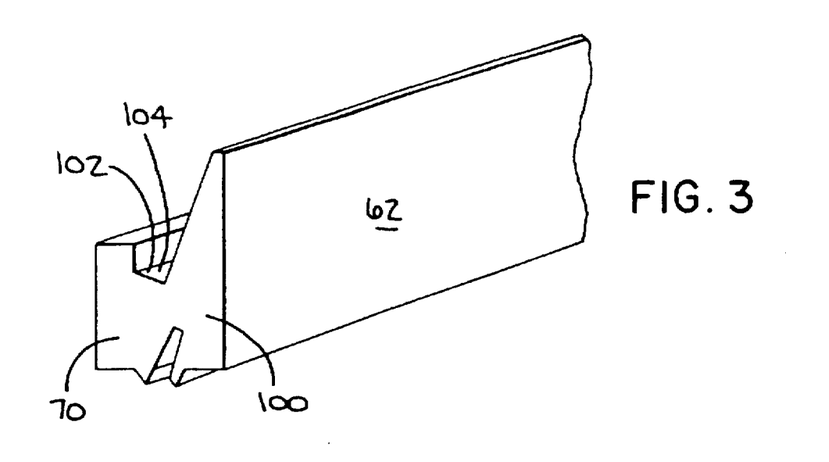
FIG. 3 is an enlarged, fragmentary, perspective view of a bar used to engage an exposed surface on a sheet material to facilitate controlled movement thereof on the apparatus of FIGS. 1 and 2.
Figure 10:
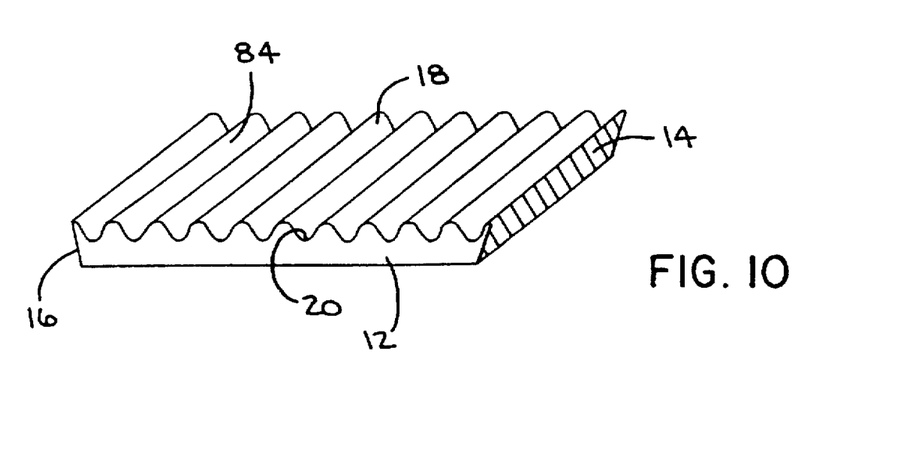
FIG. 10 is a schematic representation of a sheet material having its ends cut with the inventive apparatus and according to the inventive method.

In FIGS. 1 and 2, an apparatus, according to the present invention, is shown at 10 for cutting a sheet material 12. The nature of the sheet material 12 may vary considerably. The inventive apparatus 10 is particularly suitable for cutting a sheet material 12, such as the molding pad shown in FIG. 10. The pad 12 can be wrapped around a cylindrical molding drum core with its ends 14,16 butted to define a sleeve that has alternating cogs 18 and notches 20 extending widthwise at regular intervals along the length thereof. Belt components can be built up around the wrapped pad 12 to define a belt sleeve with complementary cogs and notches. The size, shape, and pitch of the cogs 18 and notches 20 may vary. The cog spacing may also be irregular. The disclosed pad 12 is only exemplary of one type of sheet material that can be cut employing the apparatus 10.

Figure 7:
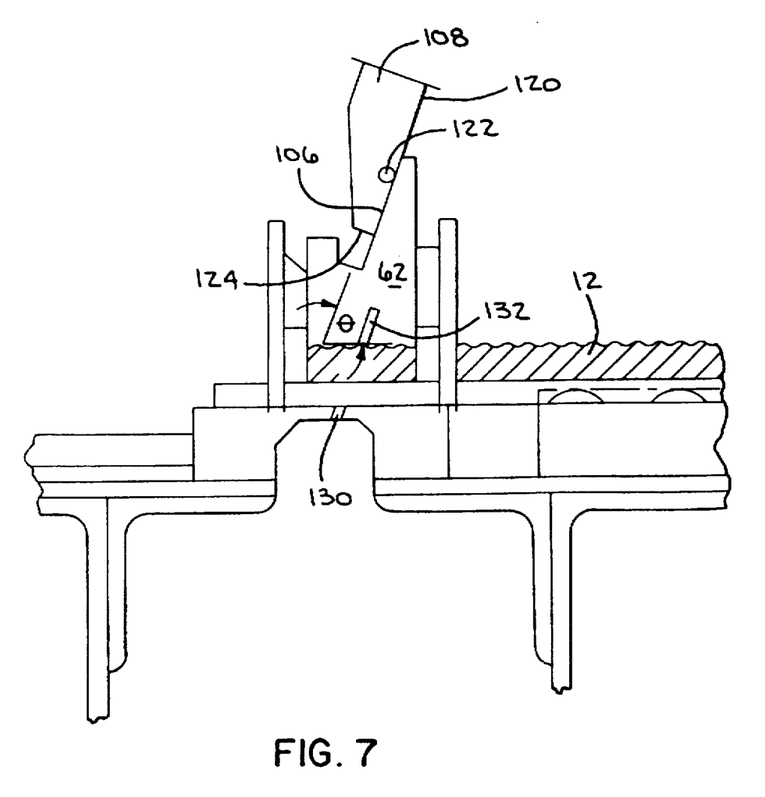
FIG 7 is an enlarged, fragmentary, side elevation view showing a bar abutted to a pressing element that consistently limits movement of the sheet material in a cutting position therefor.
Figure 8:
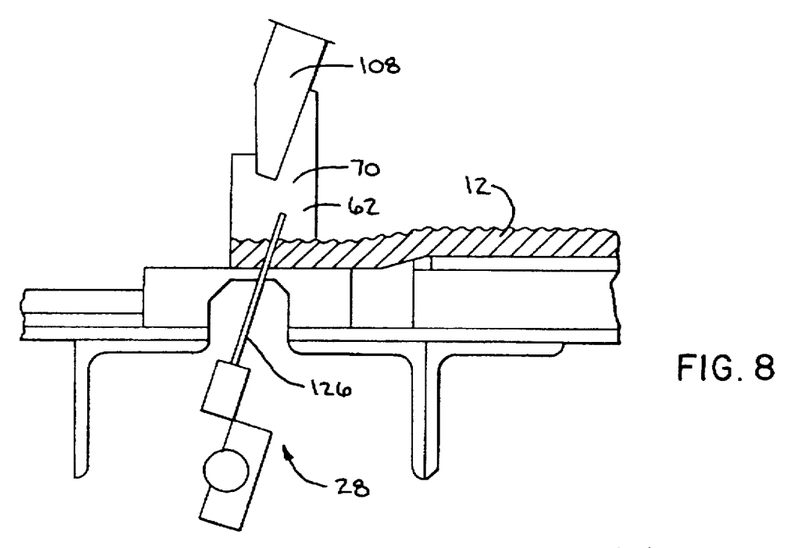
FIG. 8 is an enlarged, fragmentary, side elevation view of the pressing element urging a bar against the sheet material and with a cutting element operatively engaged with the sheet material.
Figure 9:
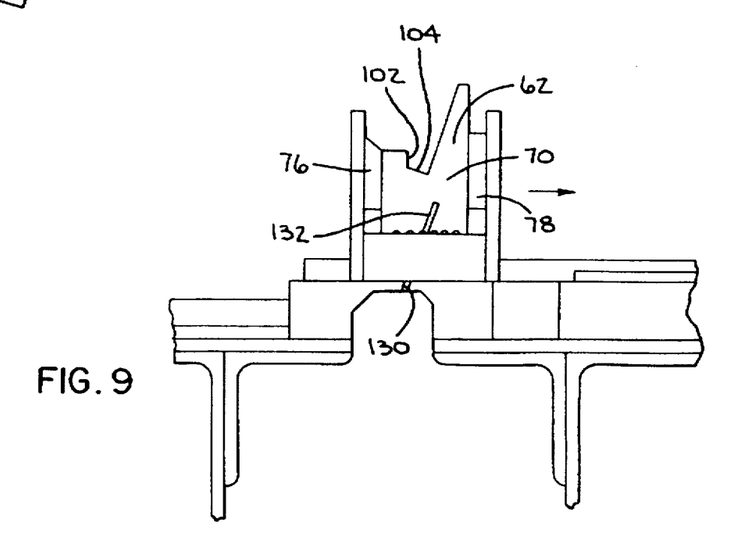
FIG. 9 is an enlarged, fragmentary, side elevation view showing a bar being retracted after severance sheet material.

Returning to FIGS. 1 and 2, the apparatus 10 consists generally of a first means at 22, in the form of a table, for supporting the sheet material 12, second means at 24 on the table 22 for engaging and advancing the sheet material 12 from a loading location, at 26 at a feed end 27 of the table 22, to a cutting position as shown in FIGS. 7 and 8 and described in greater detail hereafter. Means are provided at 28 for guidingly cutting a sheet material in the cutting position therefor. The severed portion of the sheet material 12 can be conveniently removed at the table end 29 opposite the feed end 27.

The first means/table 22 has a bed 30, supported in an elevated position by a plurality of legs 32. The bed 30 has an upwardly facing surface 34 for supporting the sheet material 12. To facilitate movement of the sheet material 12 along the surface 34, a plurality of rolling members 36 are provided thereon. In this case, each rolling member 36 has a universally mounted ball 38, with the top surfaces 40 thereof cooperatively defining a flat surface 34' for supporting the sheet material 12. It should be understood that the rolling members 36 could be made using cylindrical-type rollers in place of the balls 38. The rolling members 36 permit even a sticky, unvulcanized rubber sheet material to be moved smoothly along the surface 34. The rolling members 36 are shown to be concentrated near the center of the bed 30 to permit uninhibited movement of the sheet material 12 thereat.

Figure 4:
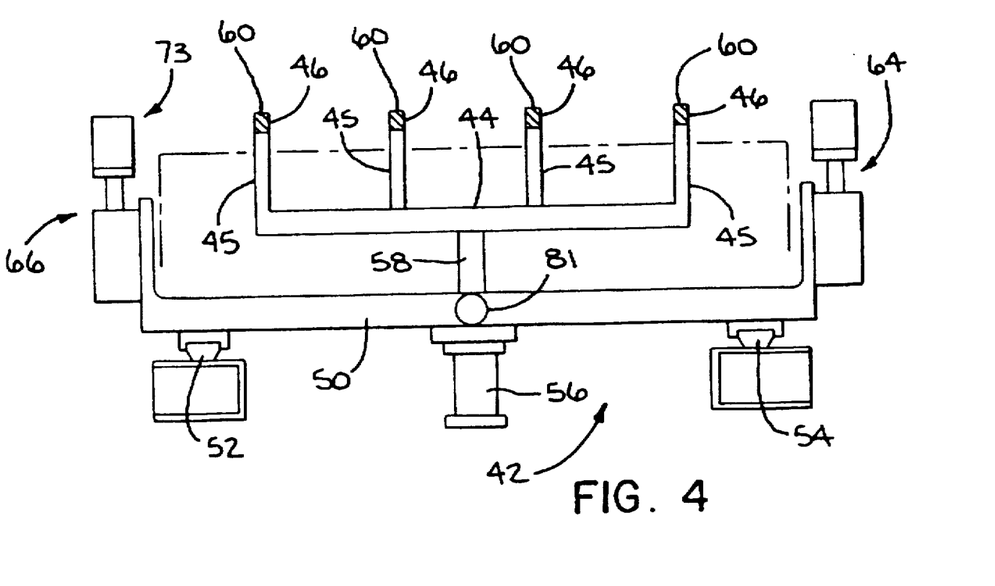
FIG. 4 is a schematic, end elevation view of a structure for lifting a sheet material supported on the cutting apparatus to facilitate movement thereof.
Figure 5:
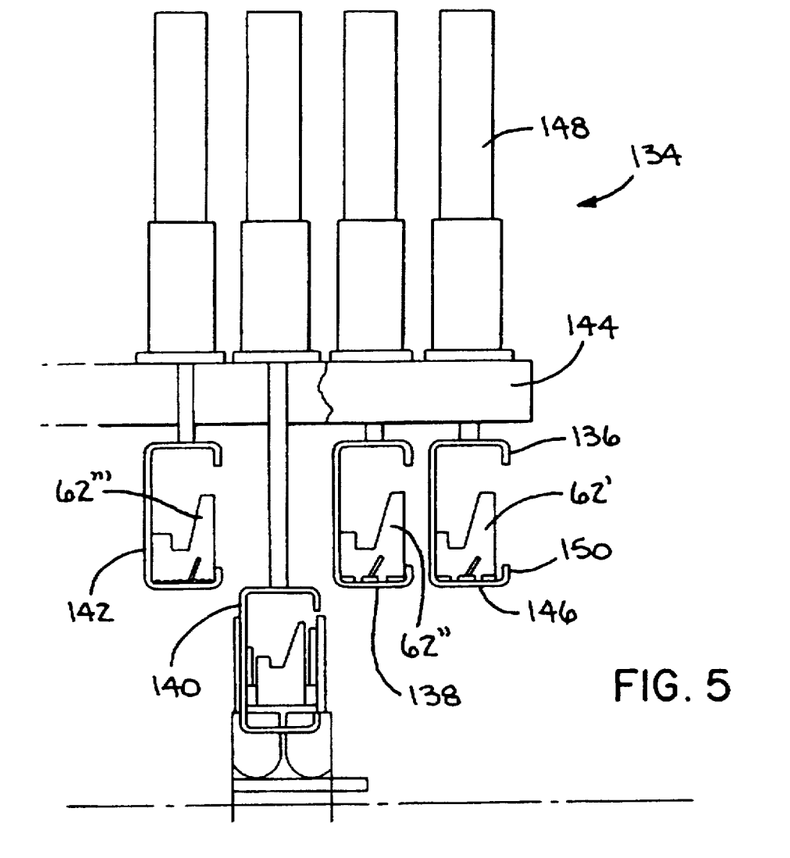
FIG. 5 is an enlarged, fragmentary, front elevation view of a structure for storing different types of bars, as in FIG. 3, and shown in the process of transferring one of the bars to/from an operative position.
Figure 6:
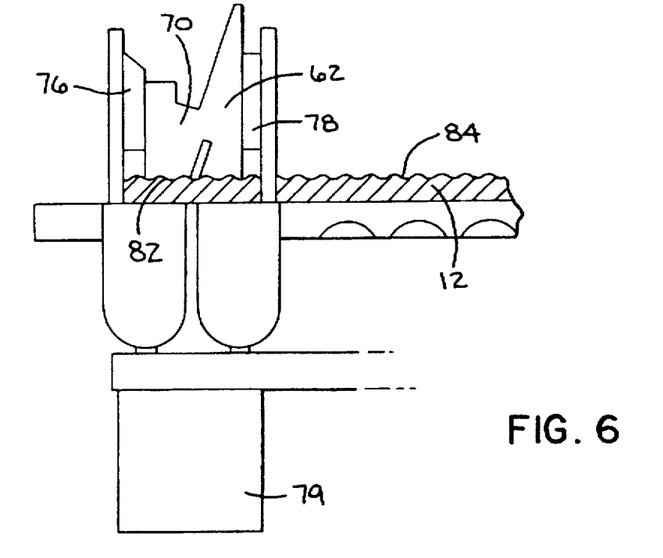
FIG. 6 is an enlarged, fragmentary, side elevation view of one of the bars operatively associated with a sheet to be cut.

The second means 24 effects advancement of the sheet material 12 from the loading location at 26 in FIG. 1 into the cutting position. To accomplish this, the second means 24 includes a means at 42, shown schematically in FIG. 4, for moving the sheet material 12 vertically away from the surface 34 and translating the sheet material 12 in a horizontal path to the cutting position. More particularly, the means 42 includes a horizontal plate 44 which carries a plurality, and in this case four, vertically extending, and equidistantly spaced, plates 45 with a like number of lifting fingers 46 which project through aligned slots 48 in the surface 34.

The plate 44 is supported upon a carriage 50 which is mounted on laterally spaced rails 52,54 for guided movement lengthwise of the apparatus 10, i.e., from right to left in FIGS. 1 and 2. The plate 44 is vertically movable relative to the carriage 50 through a cylinder 56 which selectively extends and retracts a rod 58 attached to the plate 44. With the plate 44 in the position shown in FIG. 4, the free ends 60 of the fingers 46 cooperatively engage and support a portion of the sheet material 12 in an elevated position relative to the surface 34. The slots 48 have a sufficient length to permit the fingers 46 to carry the sheet material 12 fully into the cutting position therefor.

Translation of the sheet material 12 in a consistent orientation is assisted by a third means 62, in the form of an elongate bar, spanning the width of the surface 34 between spaced supports 64,66 for the bar 62. The details of one exemplary bar 62 and its operation are shown in FIGS. 1–9. The supports 64,66 define means for releasably holding the spaced ends 68,70 of the bar 62. The supports 64,66 are the same and description herein will be limited to the exemplary support 66.

The support 66 is carried on a linking plate 72 secured at the top of the carriage 50 to follow horizontal movement thereof. The support 66 has a gripping assembly 73 with a base plate 74 on which the bar end 70 rests. A pair of grippers 76,78 are mounted for movement selectively towards each other, to a gripping position wherein they cooperatively grasp the bar end 70, and a release position. Movement of the grippers 76,78 is effected through a cylinder 79. The supports 64,66 are movable horizontally with the carriage 50 along the rails 52,54 by a cylinder 80 that extends and retracts a rod 81 attached to the carriage 50.

The bar 62 has a downwardly facing surface 82 that is matched to the exposed, contoured, cogged surface 84 of the sheet material 12. The surfaces 82,84 need not be fully matching and could be another complementary shape that allows meshing of the surfaces 82,84 sufficiently to consistently locate the bar 62 relative to the sheet material 12 as the bar 62 and sheet material 12 are advanced in operation.

The gripping assembly 73 is movable vertically relative to the carriage 50 by a cylinder 88 with associated guide bars 90.

The bar 62 has an elongate body 100 with an upwardly opening slot 102 along its length that converges vertically downwardly to a base surface 104 at the bottom of the slot 102. The configuration of the bar 62 allows the bar 62 to perform different functions. One of these functions is to stop/limit movement of the sheet material 12 by the second means once the sheet material 12 is moved into the cutting position.

To accomplish this, one bar surface 106 bounding the slot 102 is arranged to be intercepted by a pressing element 108 which is part of a means at 110 for urging the bar 62 against the sheet material 12 in the cutting position therefor to positively maintain the orientation of the sheet material on the table 22, as described hereinbelow. More particularly, the means 110 includes a cylinder 112 with an extendable rod 114 connected to the pressing element 108 so that the pressing element 108 follows movement of the rod 114.

The cylinder 112 and pressing element 108 are carried on a beam 115, spanning the width of the surface 34,34' and supported by legs 115 at its ends and by guide bars 116 between the cylinder 112 and each leg 115 in such a manner that the linear path of movement of the pressing element, as indicated by the double-headed arrow 118, makes an angle θ with the flat, horizontal table surface 34. This angle θ corresponds to the bias angle for the cut ends/edges 14,16 of the sheet material 12. The significance of this will be explained below. However, the angle θ may be different than the bias angle for the cut ends 14,16.

With the pressing element 108 in a partially extended state, shown in FIG. 7, the surface 120 thereon facially abuts to the advancing body surface 106. This contact is detected by a sensor 122, which sends a signal to an actuator for the cylinder 80 to arrest movement of the carriage 50 and associated structure. The sheet material 12 is then in the cutting position of FIG. 7.

After the cylinder is operated to lower the sheet material 12 to the surface 34,34', the cylinder 112 is operated to further extend the pressing element 108 so that the end 124 thereof abuts to the base surface 104 of the bar 62 and nests in the slot 102. Continued downward movement of the pressing element 108 causes the bar 62 to positively capture the sheet material 12 against the supporting surface 34,34' therefor so that the sheet material 12 is positively held in its cutting position. The meshing of the bar 62 with the surface 84 of the sheet material prevents skewing of the sheet material 12 from its cutting position.

The cutting means 28 can then be operated to effect severance of the sheet material 12. More particularly, the cutting means 28 includes a cutting element 126 that is operable by a cylinder 128. The cutting element 126 is moved between the sides of the apparatus 10.

The cutting element 126 extends through a slot 130 through the surface 34, with the free end thereof extending into a downwardly opening guide slot 132 in the bar 62. The slots 130,132 are inclined from the vertical at an angle θ corresponding to the angle of the linear path of the pressing element 108. With the sheet material 12 in its cutting position, the slots 130,132 align to allow the cutting element 126 to pass through the slot 130 and into the slot 132 without interference. The cutting element 126 is guidingly moved back and forth along the bar 62 to effect precision severance of the sheet material in a widthwise direction. The line of cutting is maintained true by the cooperative arrangement of the cutting element 126 and bar 62.

Another aspect of the invention is the provision of bars 62',62" and 62'", which can be selectively placed in operative position on the supports 64,66 in substitution for the bar 62. The bars 62,62',62" and 62'", which may accommodate cogs of different size, shape and spacing, are releasably held in a storing means at 134. The storing means 134 has hangers 136,138,140,142 depending therefrom with each configured to accept one bar 62,62',62" and 62'". Since all of the hangers 136,138,140,142 are similarly constructed and operate in like fashion, the description herein will be limited to the exemplary hanger 136.

The hanger 136 depends from an elongate plate 144 that is suspended in cantilever fashion from the beam 115. The hanger 136 has an upwardly opening, U-shaped receptacle 146 and an operating cylinder 148 that is connected by a plate 149 to the plate 144 and to the hanger 136 to selectively lower the hanger 136 from the raised position shown in FIG. 2 to a lowered/transfer position, corresponding to the lowered position shown for the hanger 140 in FIG. 5.

To place the bar 62' in the hanger 136 in an operative position on the supports 64,66, the cylinder 148 is operated to lower the hanger 136 to its transfer position. The supports 64,66 are translated by the cylinder 80 to be in vertical alignment with the hanger 136 and then elevated by the cylinder 88 to the point that the bar 62 abuts to the base plate 74 so that the grippers 76,78 on each support 64,66 can squeeze the bar 62' in the hanger 136. The supports 64,66 and bar 62' held thereby are then raised further sufficiently to clear a leg 150 on the hanger 136, whereupon the supports 64,66 with the bar 62' in an operative position therein, can be retracted to the right in FIGS. 1 and 2. The cylinder 148 can then be operated to retract the hanger 136 to the raised position.

This same procedure can be followed to place any of the bars 62,62',62", and 62'" operatively in the supports 64,66. The operative bar 62,62',62" and 62'" can be replaced in the hangers 136,138,140,142 by reversing the steps described above.

With this arrangement, the apparatus 10 can be readily converted to accommodate sheet material 12 having cogs 18 of different shape, size and pitch. This conversion can be effected rapidly so that down time is minimized.

A typical cutting procedure using the inventive apparatus will now be described. The sheet material 12 is loaded onto the apparatus at the loading location 26, with the cogs 18 thereon facing upwardly and an opposite flat surface of the sheet material 12 abutting to the surface 34,34'. The sheet material 12 is manually advanced over the lifting fingers 46.

The desired bar 62,62',62",62'" is operatively placed on the supports 64,66. The use of the exemplary bar 62 will be described. The cog that is to be severed is marked and lined up appropriately under the bar 62, which is lowered into abutment with the sheet material 12. The grippers 76,78 associated with each support 64,66 are then moved apart to allow the bar surface 82 to mesh with the exposed sheet material surface 84.

The grippers 76,78 are then moved together to pinch the bar 62. Once this occurs, the fingers 46 are elevated to lift a portion of the sheet material 12. The bar 62 and supports 64,66 move simultaneously therewith. The sheet material 12 is then advanced by the cylinder 80 to its cutting position.

The pressing element 108 is lowered sufficiently to intercept the advancing bar 62. The sensor 122 detects the bar 62 and thereby arrests further translational movement of the sheet member 12 beyond the cutting position.

The grippers 76,78 are then released, whereupon the supports 64,66 and fingers 46 are lowered so that the sheet material 12 abuts to the surface 34,34'. The carriage 50 is then retracted to a standby position.

The pressing element 108 is then advanced to press the bar forcibly against the sheet material 12. The cutting element 126 is then advanced through the slots 130,132 and into the sheet material 12 and is guided thereby across the width of the apparatus to thereby sever the sheet material at the desired bias angle.

The removed portion of the sheet material 12 and the cut sheet material can then be removed from the opposite end 29 of the apparatus 10.

The carriage 50 is then advanced to position the supports 64,66 to pick up the bar 62. The supports 64,66 are lifted and re-engage the bar 62, at which time the carriage 50 can be retracted to a starting position.

To cut the other end of the sheet material, the sheet material is reversed and the procedure repeated.

The sheet material 12 has straight ends 14,16 that are matching in angle and thickness when the sheet material 12 is formed into a cylindrical shape.

The above procedure can be repeated as necessary. It may be necessary to substitute during or after one of the procedures a different bar 62,62',62",62'", which can be accomplished in the manner described above.

The above operations can be coordinated by a central controller whereby the above procedure is carried out automatically.

The foregoing disclosure of specific embodiments is intended to be illustrative of the broad concepts comprehended by the invention.

We claim:

1. A cutting system for a sheet material, said cutting system comprising:

a sheet material that comprises a rubber layer to define at least a part of a sleeve from which a power transmission belt is formed, said sheet material having a thickness, a width between first and second edges, and a length between third and fourth edges;

first means for supporting the sheet material;

second means for engaging and advancing the sheet material on the first means in a first path to a predetermined cutting position; and means for guidingly cutting a sheet material in the cutting position, said cutting means including a cutting element and means for translating the cutting element in a substantially straight path at least one of a) from the first edge to the second edge and b) from the third edge to the fourth edge, wherein the sheet material has an exposed, contoured surface having a series of projections and depressions, each said projection and depression extending generally from said first edge to said second edge and the second means includes third means having a surface having a length aligned with the width of said sheet material, said third means surface having at least two surface projections and at least one depression, each of said surface projections and surface depressions extending generally along the length of said third means surface, such that said third means surface is complementary and substantially conformed to the contoured surface of the sheet material for engaging the contoured surface of the sheet material, said contoured surface and complementary surface being keyed to each other to substantially prevent relative movement between the contoured and complementary surfaces along the first path, and wherein there is a means for urging the third means against the sheet material in the cutting position to positively maintain the orientation of the sheet material in the cutting position, wherein the means for urging the third means includes a pressing element for engaging the third means and an extendable cylinder for advancing the pressing element against the third means so as to thereby captively maintain the sheet material in the cutting position.

2. The cutting system according to claim 1 including means cooperating between the third means and at least one of the pressing element and cylinder for limiting movement of the second means in at least one direction to facilitate consistent location of the sheet material engaged and advanced by the second means in the cutting position.

3. The cutting system according to claim 1 wherein the first means includes an upwardly facing flat surface for supporting the sheet material and the pressing element is advanced by the extendable cylinder in a line at other than a right angle to the plane of the upwardly facing flat surface.

4. A cutting system for a sheet material, said cutting system comprising:
a sheet material that comprises a rubber layer to define at least a part of a sleeve from which a power transmission belt is formed said sheet material having a width extending from a first edge to a second edge;
first means for supporting the sheet material;
second means for engaging and advancing the sheet material on the first means to a predetermined cutting position; and
means for guidingly cutting the sheet material in the cutting position,
wherein the sheet material has an exposed, contoured surface having a series of projections and depressions, each said projection and depression extending generally from said first edge to said second edge and the second means includes third means having a surface having a length aligned with the width of said sheet material, said third means surface having at least two surface projections and at least one depression, each of said surface projections and surface depressions extending generally along the length of said third means surface, such that said third means surface is complementary to the contoured surface of the sheet material for engaging the contoured surface of the sheet material,
wherein the second means includes means for releasably holding the third means in an operative position,
wherein the third means comprises an elongate bar,
there further being at least a second elongate bar to be releasably held by the means for releasably holding the third means.

5. The cutting system according to claim 4 wherein the first means includes means for storing at least one of the bars.

6. The cutting system according to claim 5 wherein the second means includes means for repositioning the means for releasably holding the third means to allow an elongate bar to be transferred between the means for releasably holding the third means and the storing means.

7. The cutting system according to claim 5 wherein there are means for repositioning the storing means to allow an elongate bar to be transferred between the means for releasably holding the third means and the storing means.

8. A cutting system for a sheet material, said cutting system comprising:
a sheet material that comprises a rubber layer to define at least a part of a sleeve from which a power transmission belt is formed said sheet material having a width extending from a first edge to a second edge;
first means for supporting the sheet material;
second means for engaging and advancing the sheet material on the first means to a predetermined cutting position; and
means for guidingly cutting the sheet material in the cutting position,
wherein the sheet material has an exposed, contoured surface having a series of projections and depressions, each said projection and depression extending generally from said first edge to said second edge and the second means includes third means having a surface having a length aligned with the width of said sheet material, said third means surface having at least two surface projections and at least one depression, each of said surface projections and surface depressions extending generally along the length of said third means surface, such that said third means surface is complementary to the contoured surface of the sheet material for engaging the contoured surface of the sheet material,
wherein the second means includes means for releasably holding the third means in an operative position,
wherein the means for releasably holding the third means includes first and second grippers and means for mounting the first and second grippers for movement selectively towards each other to a gripping position and away from each other to a release position.

9. A cutting system for a sheet material, said cutting system comprising:
a sheet material that comprises a rubber layer to define at least a part of a sleeve from which a power transmission belt is formed and having an exposed contoured surface,
said sheet material having a thickness, a width between first and second edges, and a length between third and fourth edges, said contoured surface having a series of projections and depressions, each said projection and depression extending generally from said first edge to said second edge;
a support for the sheet material;
a cutting element that translates in a straight path at least one of a) from the first edge to the second edge and b) from the third edge to the fourth edge;
a bar defining a surface having a length aligned with the width of said sheet material, said bar surface having at least two surface projections and at least one depression, each of said surface projections and surface depressions extending generally along the length of said bar surface, such that said bar surface is matched and abutted to the exposed, contoured surface of the sheet material at all times as the cutting element is translated in the straight path so that the surface of the bar and exposed contoured surface of the sheet material substantially prevent movement relative to each other along a first line; and
a carriage that is movable to advance the bar and the rubber layer along the first line.

10. The cutting system according to claim 9 wherein the sheet material is movable along the first line into a cutting position, and the bar is urged towards the support to captively maintain the sheet material against the support in a cutting position.

11. The cutting system according to claim 10 wherein the bar is urged towards the support by a pressing element which is advanced by an extendable cylinder.

12. The cutting system according to claim 10 wherein there is a limiting element on the support for facilitating consistent location of the sheet material in the cutting position.

13. The cutting system according to claim 11 wherein the support has a flat surface that supports the sheet material and the pressing element is advanced by the extendable cylinder in a second line that is non-orthogonal to the flat surface of the support.

14. A cutting system for a sheet material, said cutting system comprising:
a sheet material comprising a rubber layer to define at least a part of a sleeve from which a power transmission belt is formed, said sheet material having a width extending from a first edge to a second edge and having an exposed, contoured surface having a series of projections and depressions, each said projection and depression extending generally from said first edge to said second edge;

a support for the sheet material on which the sheet material can be placed in a predetermined cutting position;

a cutting element guided in movement for cutting the sheet material in the predetermined cutting position;

a first bar having a surface having a length aligned with the width of said sheet material, said bar surface having at least two surface projections and at least one depression, each of said surface projections and surface depressions extending generally along the length of said bar surface, such that said bar surface is complementary to the exposed contoured surface of the sheet material and releasably held in an operative position for engaging the exposed, contoured surface of the sheet material to facilitate maintaining of the sheet material in the predetermined cutting position during a cutting operation; and a second bar that can be releasably held in place of the first bar for engaging the exposed, contoured surface of the sheet material to facilitating maintaining of the sheet material in the predetermined cutting position during a cutting operation.

15. A cutting system for a sheet material, said cutting system comprising:

a sheet material comprising a rubber layer to define at least a part of a sleeve from which a power transmission belt is formed, said sheet material having a width extending from a first edge to a second edge and having an exposed, contoured surface having a series of projections and depressions, each said projection and depression extending generally from said first edge to said second edge;

a support for the sheet material on which the sheet material can be placed in a predetermined cutting position;

a cutting element guided in movement for cutting the sheet material in the predetermined cutting position; and a first bar having a surface having a length aligned with the width of said sheet material, said bar surface having at least two surface projections and at least one depression, each of said surface projections and surface depressions extending generally along the length of said bar surface, such that said bar surface is complementary to the exposed contoured surface of the sheet material and releasably held in an operative position for engaging the exposed, contoured surface of the sheet material to facilitate maintaining of the sheet material in the predetermined cutting position during a cutting operation, wherein the bar is releasably held in the operative position by first and second grippers which are movable selectively towards each other to a gripping position and away from each other to a release position.

* * * * *